Jan. 12, 1960     F. VERES     2,920,785
GLASS-TO-METAL SEALS FOR CATHODE-RAY TUBES
Filed Aug. 6, 1956
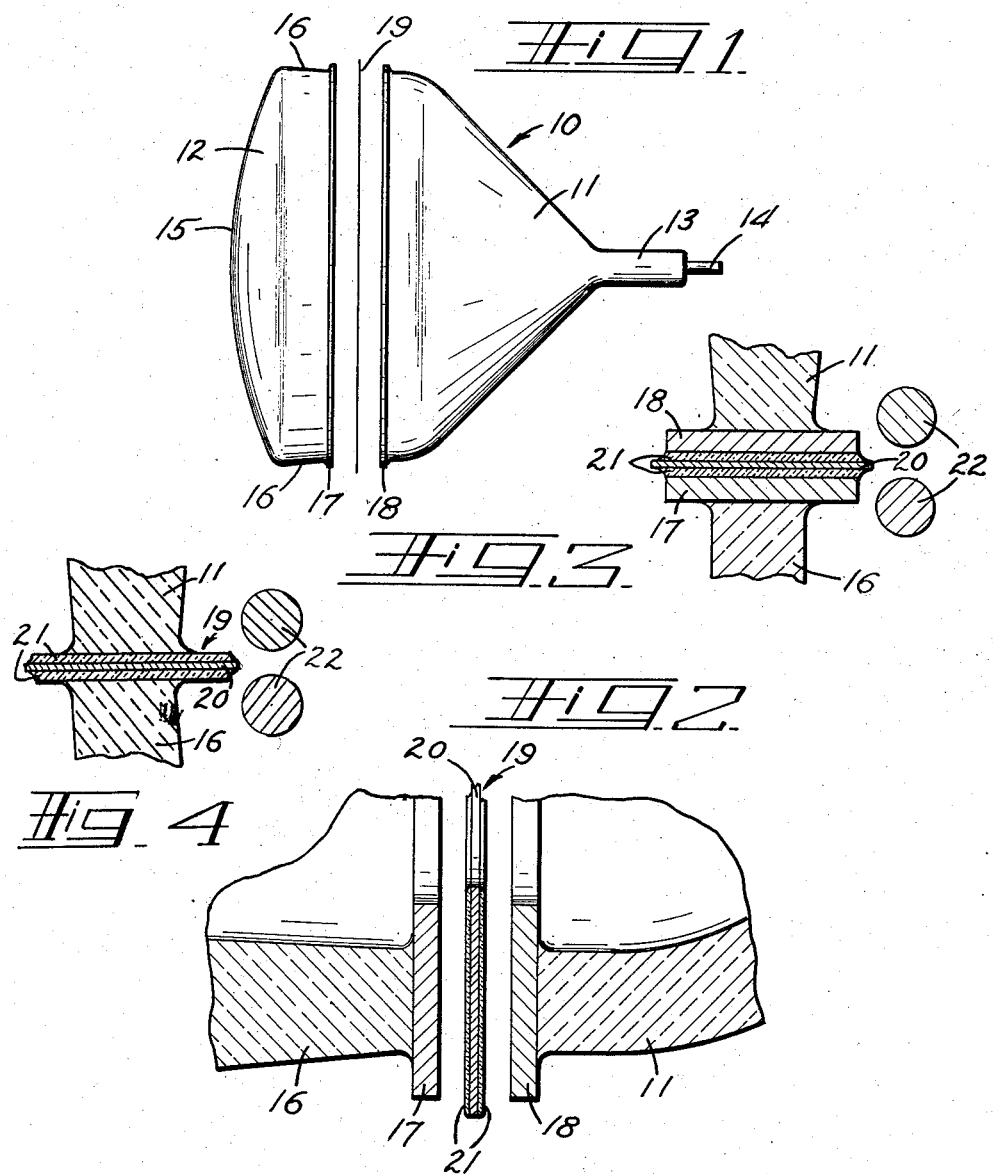
INVENTOR
FRANK VERES
BY
ATTORNEYS United States Patent Office 2,920,785
Patented Jan. 12, 1960

2,920,785
GLASS-TO-METAL SEALS FOR CATHODE-RAY TUBES

Frank Veres, Toledo, Ohio, assignor to Owens-Illinois Glass Company, a corporation of Ohio Application August 6, 1956, Serial No. 602,267

9 Claims. (Cl. 220—2.3)

This invention relates to sealing vitreous parts and more specifically to uniting prefabricated hollow glass or glass and metal parts with an electrically-conductive hermetic seal between, for example, the face plate and funnel portions of a cathode-ray picture tube envelope. The invention is also applicable to sealing together other sizeable hollow glass parts at relatively low temperatures for producing other types of electron discharge devices or structural glass bodies such as blocks or domes.

It is an object of the present invention to provide a thin metal member capable of furnishing a low-melting sealant to the sealing surfaces of glass and/or metal parts for joining the same thereby without inducing deformation, distortion, and/or permanent stresses therein.

Another object of the present invention is to provide a vacuum-tight, durable glass-to-metal seal between the face plate and cone of a cathode-ray tube envelope which seal may be created at relatively low temperatures below the annealing temperatures of glass and/or metal component parts.

Another object of the present invention is to furnish a thin endless metal band having a coating of low-melting vitreous sealing composition over its surfaces which laminated band may be interposed between sealing surfaces of several hollow glass parts for thermal sealing thereby without objectionable alteration of either the glass or contained parts.

A further object of the present invention is to provide a durable, electrically-conductive hermetic joint between glass or metal sealing surfaces of two prefabricated hollow glass parts by a thin sheet metal band carrying a low-melting sealing composition which may be thermally fused to unite said sealing surfaces by thermal softening of the sealant with electrical energy and which seal may be repeatedly sealed and unsealed without damage or distortion of said glass parts.

Many other objects and advantages will, of course, become apparent and at once suggest themselves to those skilled in the art to which the invention is directed by reading the following specification and claims in connection with the accompanying drawing wherein:

Fig. 1 is a side view of a cathode-ray tube envelope embodying the present invention in disassembled form.

Fig. 2 is an enlarged vertical sectional view of sealing areas of the disassembled tube parts.

Fig. 3 is a view similar to Fig. 2 of the parts in assembled form.

Fig. 4 is a view similar to Fig. 3 of another modification of the present invention.

In the preferred embodiment of the present invention cathode-ray tube 10 consists of a funnel 11, face plate 12, and neck tubulation 13 as shown in Fig. 1, which parts are principally composed of glass and constitute the tube envelope or bulb portion. Funnel 11 is frusto-conical in shape and neck tubulation 13 is sealed to its smaller end. Tubulation 13 has one or more electron beam guns 14 sealed into its extremity directed at the viewing area of face plate 12. The viewing area of face plate 12 consists of a uniformly curved window 15 usually circular or rectangular in shape having a phosphorescent target material (not shown) on its interior surface upon which the electrons emitted from beam guns 14 impinge to create reproduced images. Viewing window 15 is bounded by an annular flange 16 extending from the periphery of its concave surface substantially parallel to the tube axis. The overall contours of both flange 16 and the large end of funnel 11 are the same, being either rectangular or cylindrical, to provide matching glass sealing surfaces.

Flange 16 has a sealing member 17 permanently attached to its annular sealing surface and the large end of funnel 11 has a similar sealing member 18 likewise attached to its sealing surface. Sealing members 17 and 18 consist of similar endless metal flanges having generally the same overall dimensions and contour as the glass sealing surfaces of flange 16 and funnel 11 respectively with the exception of normally being wider than said sealing surfaces. Members 17 and 18 are preferably composed of a metal alloy such as stainless steel which is compatible with the glass parts particularly in thermal expansion and contraction characteristics for durable, hermetic bonding therewith. Flange members 17 and 18 have relatively flat sealing surfaces which may be thermally fused to the individual glass parts by high-temperature fusion prior to any integration of tube components. With metal flange members 17 and 18 attached, the preformed parent glass parts, namely, funnel 11 and face plate 12, are in suitable condition for the formation of a low-temperature seal after heat-sensitive elements are properly installed therein. The phosphorescent target material of the screen and other working elements placed within the tube are frequently of such nature that irreparable damage thereto and/or misalignment thereof are caused by exposure to temperatures in excess of 540° C. Thus the importance of creating a thermal bond at lower temperatures is obvious.

A primary component of the seal is a thin annular element 19 having the contour of the tube at its sealing surfaces which element is interposed between metal flange members 17 and 18. Element 19 consists of an extremely thin, endless, sheet metal band 20 having a preferable width either greater or less than metal flange members 17 and 18. Band 20 is preferably composed of metal alloy such as stainless steel No. 430 of approximately .002 to .017 inch in thickness in order to be pliable to readily conform to deviations between the opposing sealing surfaces of members 17 and 18. Band 20 is thus fully able to warp or distort out-of-flat during sealing so as to alleviate any stresses in the seal.

Metal band 20 is enameled on both surfaces with thin flat coatings of a vitreous enamel or sealing composition 21 having a coating thickness of about 12 mils which may be adhered thereto at elevated temperatures. The coating on opposing surfaces of metal band 20 may be of differing composition to be compatible with the chemical and physical properties of sealing members 17 and 18 when they are composed of different materials. This may also be necessary for sealing glass parts of different compositions. Sealing composition 21 preferably consists of a vitreous material such as a solder glass having a melting or softening point at a temperature below that at which permanent stresses are induced into the glass funnel 11 or face plate 12 by rapid cooling. Such sealing compositions have been disclosed in the copending patent application of Francl and Hagedorn entitled "Low Temperature Glass Sealing Composition," Serial No. 554,753, filed December 22, 1955.

Sealing composition 21 has a softening point temperature below the annealing point temperatures of both the parent glass parts and metal flanges. Composition 21 has the added property of being conducive to repeated sealing and unsealing of a joint without serious devitrification or alteration. The coefficients of thermal contraction of the components of the seal, namely, face plate 12, funnel 11, metal flanges 17 and 18, and sealing composition 21 need not be precisely the same, but should lie within agreeable limits so that virtually stress-free seals may be created.

The thin metal band 20 serves as a support or backing for sealing composition 21 and makes the area immediately contiguous with and between said sealant electrically conductive. The thin coated element 19 is separately prepared apart from the glass or metal parts which thus do not need to be coated with the sealant or subjected to processes for its application. Sealing composition 21 may be of relatively low chemical durability, for being separately applied, it does not need to be capable of withstanding chemical treatment of individual tube parts such as acid, alkali, or deionized water washing. Furthermore, this advantage is noteworthy in that prior to final assembly of the tube envelope, no loss of costly face plate or funnel portions is experienced due to defects either in or caused by application of the sealant. Also the exposed thickness of composition 21 in sealed condition consisting of twin narrow annular bands further enhances its weathering ability.

In order to effect the seal, the parts are juxtaposed as shown on Fig. 2 and then contacted in proper alignment as shown on Fig. 3. The sealing may be performed as part of the tube exhaust operation or in a separate operation immediately prior to exhausting. Since both the coated element and metal flange surfaces are flat, sufficient vacuum can be developed inside the tube so that complicated clamping and holding devices for alignment of parts may be eliminated for sealing. The thickness of sealing composition 21 on band 20 must be sufficient to take up the maximum "out-of-flatness" of matching flanges 17 and 18. The temperature at which composition 21 will flow and wet the flanges to seal the parts must be below the highest temperature to which the tube under vacuum can be safely exposed. These temperatures are commonly in the range of from 430 to 540° C. Coated element 19 is thin enough to avoid creation of stresses in the seal during sealing. The thermal expansions and contractions of all parts of the seal should preferably be substantially the same, although a predetermined difference in thermal expansions of the components may be advantageous in order to introduce stresses into the seal of predetermined character and magnitude.

With sealing element 19 containing a metal component and interposed between metal flanges 17 and 18, the seal is susceptible to heating by high frequency induction. Alternately metal band 20 may be heated by electrical energy directly supplied. The metal parts, namely, band 20 and flanges 17 and 18, may be surrounded by an adjacent annular high frequency coil 22 and when electrical energy is supplied from a high frequency source to coil 22, only the metal components are heated thereby while the sealing composition 21 and parent glass parts remain substantially unaffected by the high frequency waves. The heat required for sealing is thus concentrated in and between the metal components and so localized that it concentrates the softening heat in the area of sealing composition 21. Thus composition 21 is able to flow and wet the surfaces of the metal parts. Thermal energy is transmitted to the annuli of sealing composition 21 so that the latter is fused to the metallic members.

Controlled rates of heating are employed to avoid thermal shock of the parts. It may be desirable to initially heat extensive areas of the entire seal to a relatively safe low temperature of about 260° C. and then the metal components to a higher temperature of from about 430 to 490° C. by high frequency energy, thereby melting the sealing composition 21 and bonding the parts on cooling into a hermetic durable seal. The parent glass parts remain relatively cool and do not expand or distort during sealing. High frequency heating provides a quick and simple method of imparting the required thermal energy to substantially shorten heating and cooling time. This is true in both sealing and unsealing the joint.

As illustrated the coated element 19 protrudes beyond the edges of the flanges 17 and 18 to firmly bond the same on cooling. Conversely it may be desirable to have flange members 17 and 18 overhang element 19 at least in some areas around the tube circumference in order that a prying tool may be inserted between the flanges to break apart the seal in an opening or unsealing operation.

Face plate 12 and funnel 11 may be joined by coated element 19 interposed directly between their sealing surfaces as illustrated on Fig. 4. The glass sealing surfaces are first ground reasonably, although not absolutely, flat. An example of such a grind is one in which when the ground parts are brought together the maximum gap between these surfaces is about 10 to 12 mils. To effect a vacuum-tight seal between two such surfaces would necessitate a coating of 6 or 7 mils on each side of metal band 20. With band 20 coated as above it has considerable utility for directly sealing the glass sealing surfaces of the parent parts without metal flange members 17 and 18. The grinding operation is the only required processing for sealing the large hollow glass parts with element 19.

The sealant does not need to necessarily possess the level of chemical and thermal stability of the parent glass since it may be withheld from the processing steps of the face plate and funnel portions until final assembly. High frequency electrical energy may be used as described above to soften and fuse the sealing composition 21 when metal band 20 is heated thereby.

The preferred forms of seals which are described herein may also be separated by high frequency coil 22 placed around the sealing area and similarly inducing electrical energy into the metal components as in sealing. The seal is disjoined by heating the sealing composition 21 to its softening or melting temperature and separating the parts, with portions of same remaining inherent to the sealing surfaces of contacted glass and/or metal parts. Composition 21 remaining on the sealing surfaces can be utilized to reunite the parts as desired.

The term "electrical energy" as employed herein for the purpose of sealing and unsealing is intended to encompass both the direct application of electrical current and induced electrical waves as supplied by an adjacent high frequency source.

Various additional modifications may be resorted to within the spirit and scope of the appended claims.

I claim:

1. A laminated structural member for joining prefabricated hollow glass parts at their sealing surfaces into an electron discharge tube envelope comprising a thin deformable annular metal member having a thickness not in excess of 0.017 inch and being readily distortable to assume the contour of said glass sealing surfaces and thin layers of low-melting vitreous material having a softening point temperature in the range of from 430° to 540° C. firmly bonded coextensively with the sealing surfaces of the metal member and compatible with the thermal properties of said metal member.

2. A hermetically sealed envelope for an electron discharge tube comprising at least two hollow glass and metal parts consisting of a viewing member and a frusto-conical shaped member having substantially mating sealing surfaces and a thin non-planar ring-shaped metal member having a thickness not in excess of 0.017 inch fusedly interposed between said sealing surfaces with layers of thermally fusible vitreous material having a softening point temperature in the range of from 430° to 540° C. joining contiguous areas of said metal member to said mating sealing surfaces.

3. A hermetically sealed envelope for an electron discharge tube comprising at least two prefabricated hollow glass parts consisting of a viewing member and a frusto-conical shaped member, said members having substantially matching sealing surfaces a thin deformed endless metal member having a thickness ranging from 0.002 to 0.017 inch coated over its opposing surfaces with a vitreous sealing composition having a softening point temperature not in excess of 540° C. fusedly interposed between said sealing surfaces thereby uniting the opposing surfaces of said metal member to each of said glass sealing surfaces.

4. A hermetically sealed envelope in accordance with claim 3, wherein said vitreous sealing composition has a softening temperature below the annealing point temperature of said glass parts.

5. A hermetically sealed glass and metal envelope for an electron discharge tube comprising at least two prefabricated hollow glass parts having annular sealing surfaces of substantially matching contour, annular metal flanges attached to said glass sealing surfaces to form metal sealing surfaces, and a thin deformed non-planar annular metal member having a thickness not in excess of 0.017 inch fusedly interposed between said metal sealing surfaces by a thermally fusible low-melting vitreous material uniting said metal flanges, said vitreous material being adaptable to thermal sealing said glass and metal parts below 540° C.

6. A hermetically sealed glass envelope for an electron discharge tube comprising two prefabricated hollow glass parts consisting of face plate and funnel portions having substantially planar sealing surfaces of matching contour, a thin flat annular metal member having a thickness ranging from 0.002 to 0.017 inch disposed between and of greater width than said sealing surfaces, and laminations of fusible low-melting glass sealing material fusedly uniting said deformed metal member in non-planar relationship between said glass parts, said glass sealing material being of a composition adapted to repeated thermal sealing and unsealing below the annealing point temperature of said glass parts.

7. A hermetically sealed glass and metal envelope for an electron discharge tube comprising two prefabricated hollow glass and metal parts consisting of face plate and funnel portions having substantially planar metal sealing surfaces of matching contour, a thin flat deformed ring-like metal member having a thickness ranging from 0.002 to 0.017 inch disposed between and of greater width than said sealing surfaces, and laminations of fusible low-melting sealing material over the full opposing surfaces of said metal member fusedly uniting said metal member between said metal sealing surfaces, said sealing material being of a composition adapted to thermal softening in the range of from 430° to 540° C. for repeated sealing and unsealing without distortion of or objectionable stress creation within said prefabricated glass and metal parts.

8. A hermetically sealed glass and metal envelope for an electron discharge tube comprising two prefabricated hollow glass and metal parts consisting of face plate and funnel portions having substantially planar metal sealing surfaces, a thin flat deformed annular metal member having a thickness ranging from 0.002 to 0.017 inch being readily distortable to assume the contour of said metal sealing surfaces, said member being disposed between said metal sealing surfaces, and thin layers of fusible low-melting glass sealing composition about 0.007 inch in thickness fusedly united to the full opposite sides of said member to thereby unite said annular metal member to said glass and metal parts, said glass sealing composition having a softening temperature not in excess of 540° C. for minimized stress creation and dimensional control on sealing of said glass and metal parts.

9. A hermetically sealed glass and metal envelope for an electron discharge tube in accordance with claim 8, wherein said sealing composition is thermally fused at temperatures below the annealing point temperatures of both said glass and metal parts.

References Cited in the file of this patent

UNITED STATES PATENTS

| | | |
|---|---|---|
| 2,423,066 | Gibson | June 24, 1947 |
| 2,560,593 | Pask | July 17, 1951 |
| 2,568,460 | Nolte | Sept. 18, 1951 |
| 2,629,093 | Pask | Feb. 17, 1953 |
| 2,643,020 | Dalton | June 23, 1953 |
| 2,677,920 | Danzin | May 11, 1954 |
| 2,795,719 | Morrell | June 11, 1957 |

FOREIGN PATENTS

| | | |
|---|---|---|
| 253,107 | Sweden | Nov. 1, 1948 |